US008511568B2

(12) United States Patent
Arimura

(10) Patent No.: US 8,511,568 B2
(45) Date of Patent: Aug. 20, 2013

(54) SENSOR TAG MULTIPLANE IMAGING SYSTEM

(75) Inventor: Kunitaka Arimura, Kawasaki (JP)

(73) Assignee: Smart Co., Ltd., Kanagawa (JP)

( * ) Notice: Subject to any disclaimer, the term of this patent is extended or adjusted under 35 U.S.C. 154(b) by 618 days.

(21) Appl. No.: 12/312,622

(22) PCT Filed: Nov. 21, 2007

(86) PCT No.: PCT/JP2007/072545

§ 371 (c)(1),
(2), (4) Date: Jun. 26, 2009

(87) PCT Pub. No.: WO2008/062829

PCT Pub. Date: May 29, 2008

(65) Prior Publication Data

US 2009/0308934 A1 Dec. 17, 2009

(30) Foreign Application Priority Data

Nov. 21, 2006 (JP) ................................ 2006-314156

(51) Int. Cl.
*G06K 19/06* (2006.01)

(52) U.S. Cl.
USPC ............................ 235/492; 235/487; 235/493

(58) Field of Classification Search
USPC .......................................... 235/487, 492, 493
See application file for complete search history.

(56) References Cited

U.S. PATENT DOCUMENTS

| | | | | |
|---|---|---|---|---|
| 3,204,057 | A * | 8/1965 | Magida | 335/127 |
| 3,783,249 | A * | 1/1974 | Wiegand | 235/449 |
| 4,097,728 | A * | 6/1978 | Genest et al. | 235/439 |
| 4,108,366 | A * | 8/1978 | Genest et al. | 235/450 |
| 4,136,781 | A * | 1/1979 | Perry et al. | 209/552 |
| 4,883,949 | A * | 11/1989 | Kokubo et al. | 235/449 |
| 5,252,925 | A * | 10/1993 | Matsumoto et al. | 324/445 |
| 5,258,766 | A * | 11/1993 | Murdoch | 343/742 |
| 5,969,609 | A * | 10/1999 | Murdoch | 340/572.1 |
| 5,995,048 | A * | 11/1999 | Smithgall et al. | 343/700 MS |
| 6,286,759 | B1 * | 9/2001 | Nakajima et al. | 235/449 |
| 6,483,088 | B2 * | 11/2002 | Uehara et al. | 219/619 |
| 7,434,467 | B2 * | 10/2008 | Hubschen et al. | 73/643 |
| 2005/0173532 | A1 * | 8/2005 | Hasebe et al. | 235/451 |
| 2006/0022056 | A1 * | 2/2006 | Sakama et al. | 235/492 |
| 2006/0214866 | A1 * | 9/2006 | Araki et al. | 343/788 |
| 2007/0024516 | A1 * | 2/2007 | Araki et al. | 343/788 |

FOREIGN PATENT DOCUMENTS

| | | |
|---|---|---|
| JP | 2001-225921 | 8/2001 |
| JP | 2002-507816 | 3/2002 |
| JP | 2002-521757 | 7/2002 |
| JP | 2004-59320 | 2/2004 |
| JP | 2005-136570 | 5/2005 |
| JP | 2005-228785 | 8/2005 |
| JP | 2006-39991 | 2/2006 |
| JP | 2006-60432 | 3/2006 |
| JP | U3121577 | 4/2006 |
| WO | WO 9949337 A1 * | 9/1999 |

* cited by examiner

*Primary Examiner* — Daniel Hess
*Assistant Examiner* — Paultep Savusdiphol
(74) *Attorney, Agent, or Firm* — James Creighton Wray

(57) ABSTRACT

When a conventional sensor or tag is sandwiched by a plurality of metal planes, the condition is deteriorated and the sensitivity is lowered. Provided is multiplane imaging system using MISEMAS (Multi-Image Effect and Separation Method for Magnetic Sensor and Tag) in which the sensitivity is not lowered, but rather enhanced, and it is possible to separate and select each of the tags without causing interference with adjacent sensor coils $SC_1$, $SC_2$, $SC_3$, $SC_4$ or tags $R_1$, $R_2$, $R_3$, $R_4$, thereby enabling an effective use of a current on the metal surface and a magnetic path.

11 Claims, 13 Drawing Sheets

(a)

(b)

(a)

(b)

(a)

(b)

(c)

(a) (b) (c) (d) (e)

(a) (b)

SENSOR TAG MULTIPLANE IMAGING SYSTEM

This application claims the benefit of Japanese Application No. 2006-314156 filed Nov. 21, 2006 and PCT/JP2007/072545 filed Nov. 21, 2007, which are hereby incorporated by reference in their entirety.

FIELD OF THE INVENTION

The present invention relates to a method of utilizing electric current or magnetic current along a metal face in order to avoid a remarkable performance decline of a tag or a sensor comprising a modularized non-contact type IC for reading identification codes via a coil, when the sensor or tag is contacted with the metal face. When such tag or senor is sandwiched by metals, usually magnetic field components are shielded by the metals. The present invention also relates to a method of intensifying a mutual connection between the sensor and tag by utilizing a multi-image effect of the metal faces such that magnetic field components of the sensor or the tag are contained in a closed space.

RELATED BACKGROUND ART

In a conventional IC tag, a coil is wound around the IC tag usually parallel to a surface of the IC tag. When such tag is attached to or placed on a metal face, magnetic components generated by the coil are compensated by magnetic components generated by an induced electric current generated by an image effect of the metal face.

In order to improve such compensation, a magnetic sheet is inserted between the coil and the metal face, so that induced magnetic components are deviated. On the contrary, as disclosed in reference 1, induced magnetic components can be interacted with the coil so as to double a voltage generated in the coil by utilizing the image effect of the metal face positively.

Cited Reference 1: Japanese utility model registered No. 3121577

DISCLOSURE OF THE INVENTION

Problems to be Solved by the Invention

Usually performance of the IC tag or the sensor is deteriorated when the IC tag or the sensor is sandwiched by a plurality of metals, but an IC tag or senor system by the present invention enhance sensitivity of the system more by utilizing multi-images generated by such plurality of metals. The sensitivity is enhanced by dense magnetic field components condensed in a narrow space. Further a separation of the sensor or the tag from the neighboring sensor or tags is automatically done by the metal face. This is called MISEMAS (Multi-Image Effect and Separation Method for Magnetic Sensor and Tag) method.

Means to Solve the Problem

In order to solve the problems mentioned above, the sensor tag multiplane imaging system by the present invention is constituted as one of the following arrangements from (1) to (11).

(1) A sensor tag multiplane system comprising one or more metal plates having a curved face and a sensor or tag having a magnetic substance and a coil wound around the magnetic substance, wherein: the sensor or the tag is sandwiched by the one or more metal plates such that an axis direction of the coil is parallel to faces of the one or more metal plates; at least one end of the metal plates perpendicular to the axis direction of the coil are insulated; magnetic field components generated by the coil are condensed in a space formed by the one or more metal plates and the sensor or said the; and the space is sandwiched by the one or more metal plates.

(2) A sensor tag multiplane system comprising a plurality of metal plates having flat or curved faces and a sensor or a tag having a magnetic substance and a coil wound around the magnetic substance, wherein: the sensor or the tag is sandwiched by the plurality of metal plates such that an axis direction of the coil is parallel to faces of the plurality of metal plates; the plurality of metal plates are insulated each other; magnetic field components generated by the coil are condensed in a space formed by the plurality of metal plates and the sensor or the tag; and the space is sandwiched by the plurality of metal plates.

(3) The sensor tag multiplane system according to (2), wherein: at least two of the plurality of metal plates are short circuited; at least one or more magnetic substances functioning as returning paths for generated magnetic field components by the coil, is arranged in a space formed by the short circuited metal plates and the sensor or the tag parallel to an axis direction of the coil; and the space is sandwiched by the short circuited metal plates.

(4) The sensor tag multiplane system according to (3), wherein: the magnetic substance and the magnetic substances for returning paths are formed in a monolithic body.

(5) The sensor tag mautiplane system according to one of (1) to (4), wherein: the magnetic substance is formed in a cylindrical shape, and the metal plates are arranged so as to surround the cylindrical magnetic substance.

(6) The sensor tag multiplane system according to one of (1) to (5), wherein: the plurality metal plates are formed concentric cylindrical, oval or polygonal shapes, and the sensor or the tag is sandwiched by a space formed by the cylindrically, ovally or poligonally shaped metal plates.

(7) An application of the sensor tag multiplane system according to one of (1) to (6), wherein: the sensor tag multiplane system is applied to a slot for inserting a magnetic card.

(8) An application of the sensor tag multiplane system according to one of (1) to (6), wherein the sensor tag multiplane system is employed for controlling a computer, metal mold or a metal component.

(9) The application of the sensor tag multiplane system according to (8), wherein: a resonating frequency is adjusted beforehand when an inductance is changed by surrounding metal faces of the computer, the metal mold or the metal component.

(10) The sensor tag multiplane system according to one of (1) to (4), wherein: pairs of a sensor or a tag and a coil wound around the sensor or the tag are consecutively arranged and respectively separated by metal plates from other pairs.

(11) A computer application system or a device which is constituted by the sensor tag multiplane system according to one of (1) to (10).

(12) The senor tag multiplane system according to one of (1) to (4), wherein: pairs of a sensor or a tag and a coil wound around the sensor or the coil are consecutively arranged and respectively separated by metal plates from other pairs.

(13) A computer system or a device to which the sensor tag multiplane system according to one of (1) to (12) is applied.

Effects Attained by the Invention

When a sensor or a tag is arranged in a space formed by flat or curved metal faces, a sensitivity of the sensor or the tag is raised by multi-images generated by these metal faces and the sensitivity is kept from lowering by suppressing generating reverse electric current. Pairs of the sensor and the tag are separated by the metal faces, and interferences among the tags are suppressed by the metal faces. Various complicated applications of RFID tags and the sensors are solved by the MISEMAS method which can separate tags at positions where the sensors are attached.

BRIEF DESCRIPTIONS OF THE DRAWINGS

FIG. 1 [(*a*), (*a*'), (*b*), (*c*), (*d*), (*e*)] is schematic views for explaining a principle of the multiple imaging system by the present invention.

FIG. 2 [(*a*), (*b*), (*c*), (*d*), (*e*)] is schematic views for explaining multiple images generated by two or more metal plates.

Figure 5:
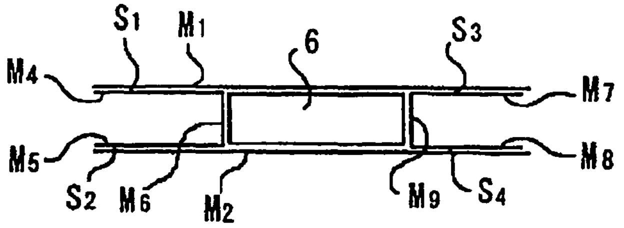
Figure 5:
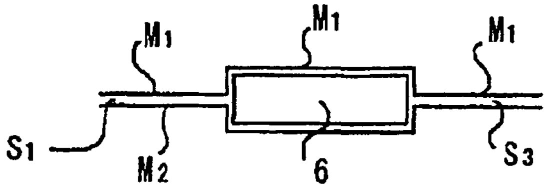

FIG. 5 [(*a*), (*b*)] is schematic views illustrating a four-metal-plate configuration for generating multiple images.

Figure 6:
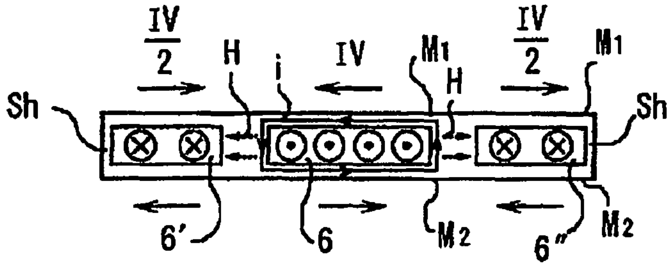
Figure 6:
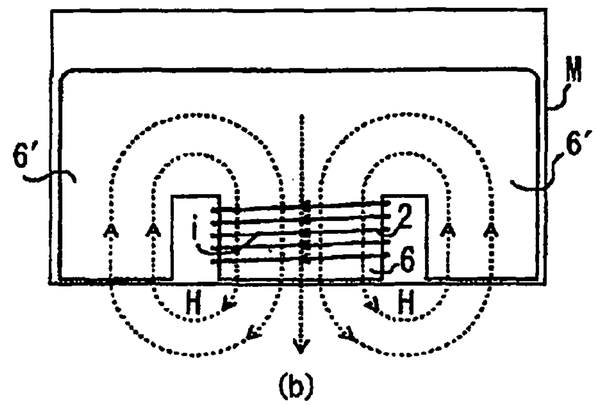

FIG. 6 [(*a*), (*b*)] is schematic views illustrating a configuration comprising metal plates and magnetic substances for generating circular currents.

Figure 7:
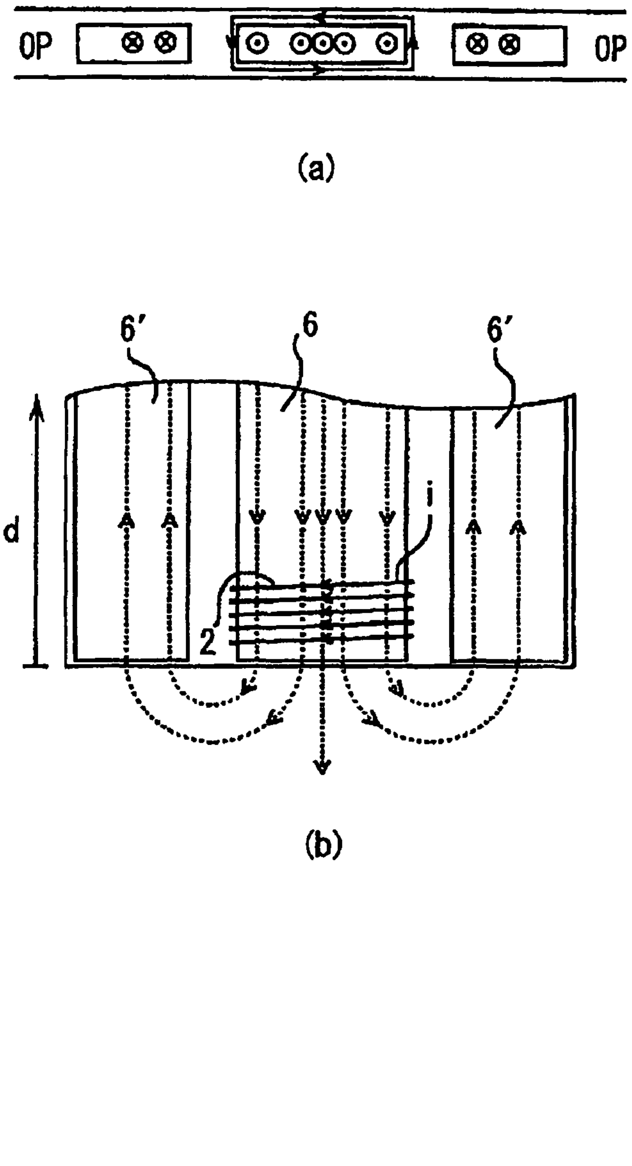

FIG. 7 [(*a*), (*b*)] is schematic views illustrating a modified configuration from the configuration in FIG. 6.

Figure 8:
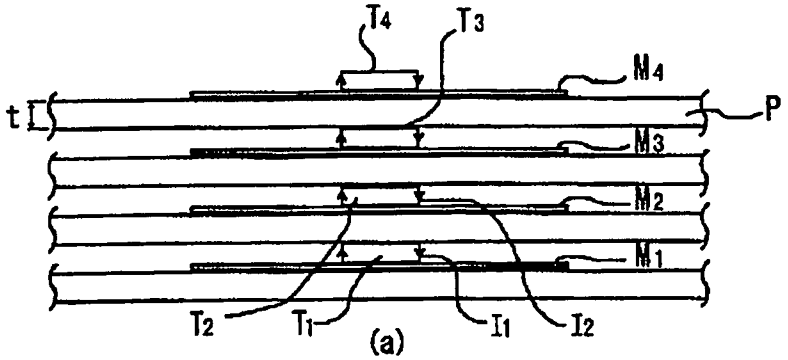
Figure 8:
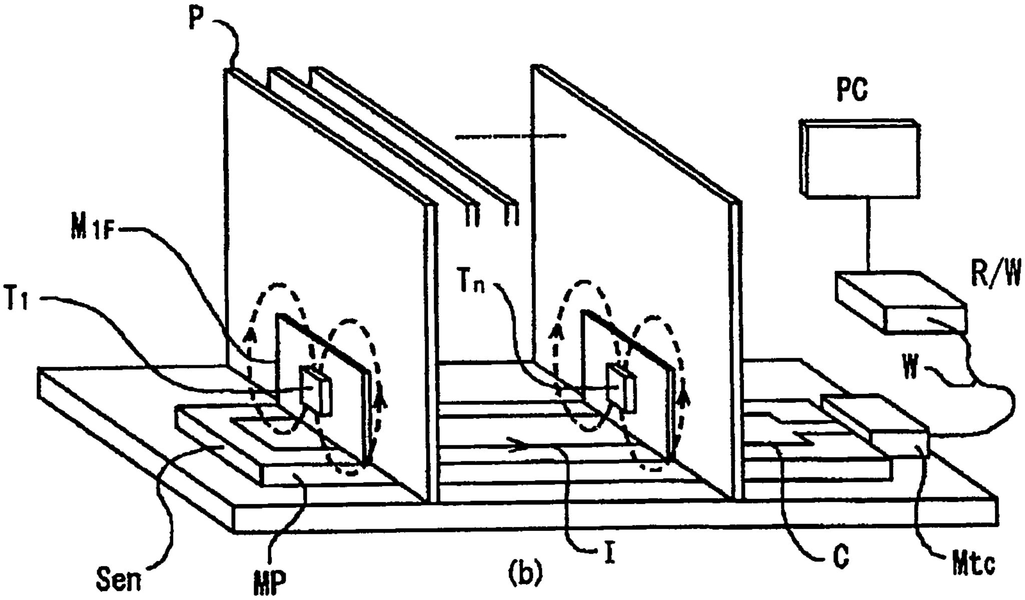
Figure 8:
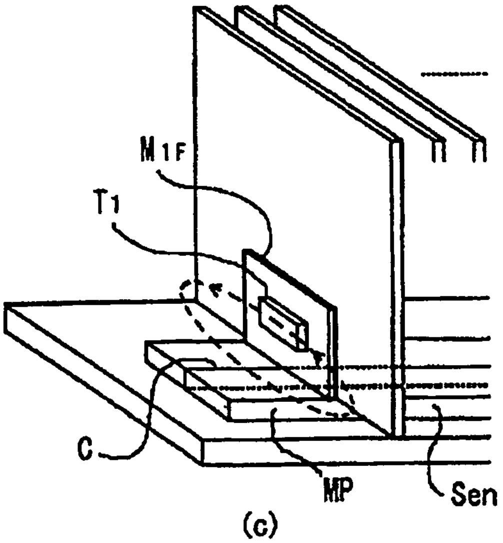

FIG. 8 [(*a*), (*b*), (*c*)] is schematic views illustrating applied example of tags or the sensor to the multiple image system by the present invention.

Figure 9:
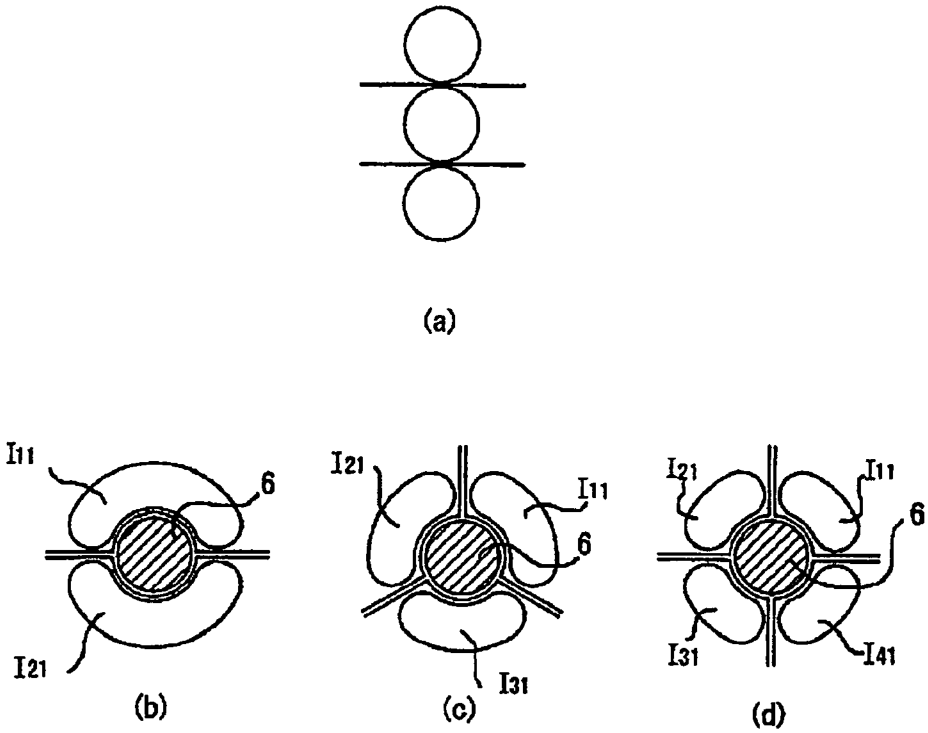

FIG. 9 [(*a*), (*b*), (*c*)] is schematic views illustrating configurations where coils wound around circular magnetic substances.

Figure 10:
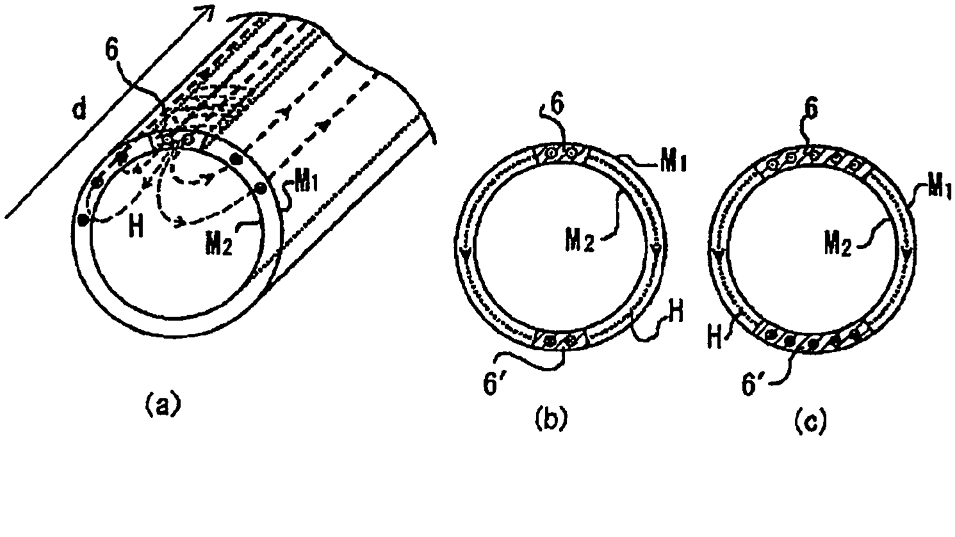

FIG. 10 [(*a*), (*b*), (*c*)] is schematic views illustrating configurations comprising concentrically arranged metal plate cylinders for generating multiple images.

Figure 11:
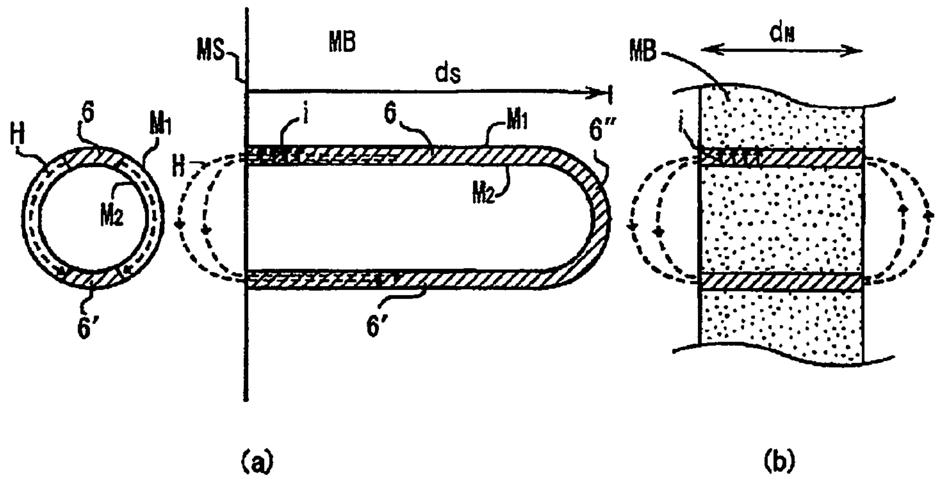

FIG. 11 [(*a*), (*b*)] is schematic views illustrating modified configurations from those illustrated in FIG. 10.

Figure 12:
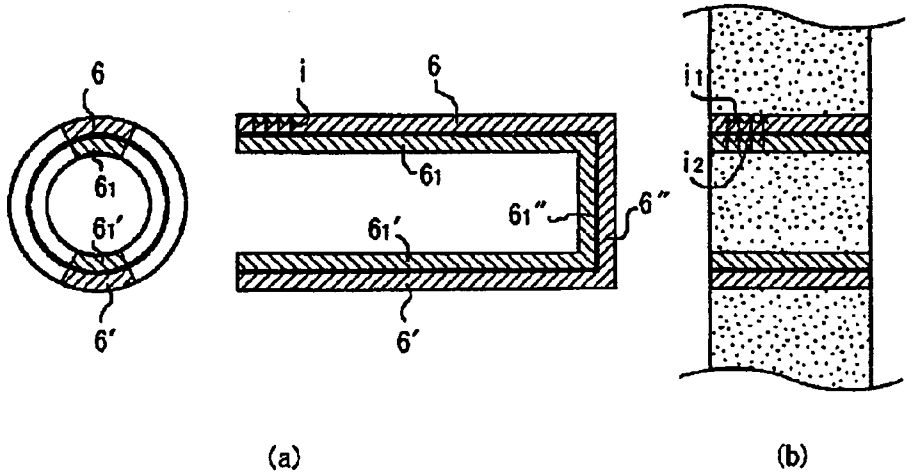

FIG. 12 [(*a*), (*b*)] is schematic views illustrating configurations where more concentrically arranged metal plate cylinders and magnetic substances are arranged.

Figure 13:
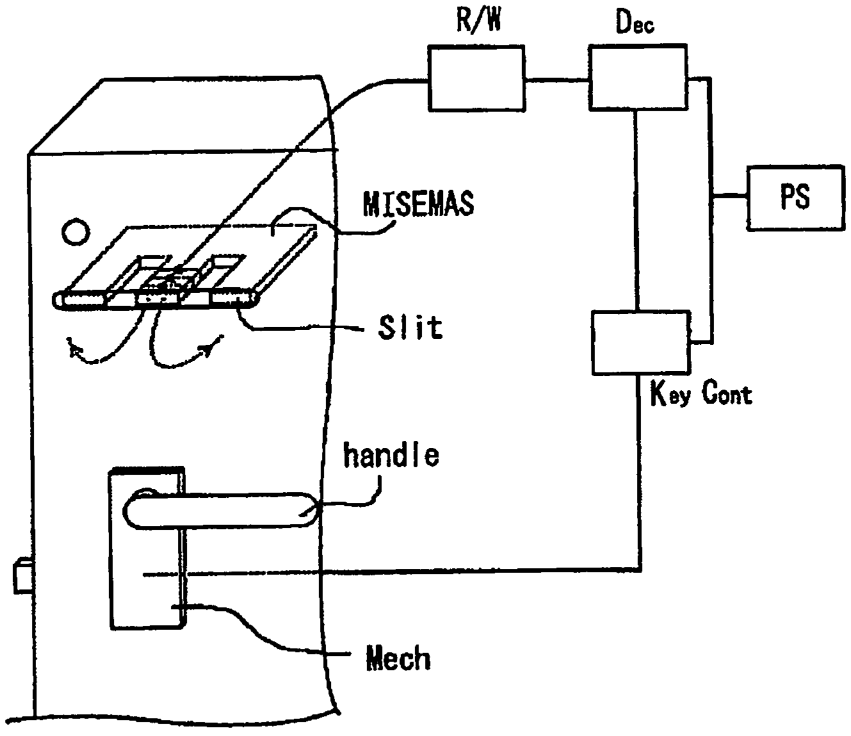

FIG. 13 is a schematic view illustrating an applied example of the sensor illustrated in FIG. 6 to a card slot.

Figure 14:
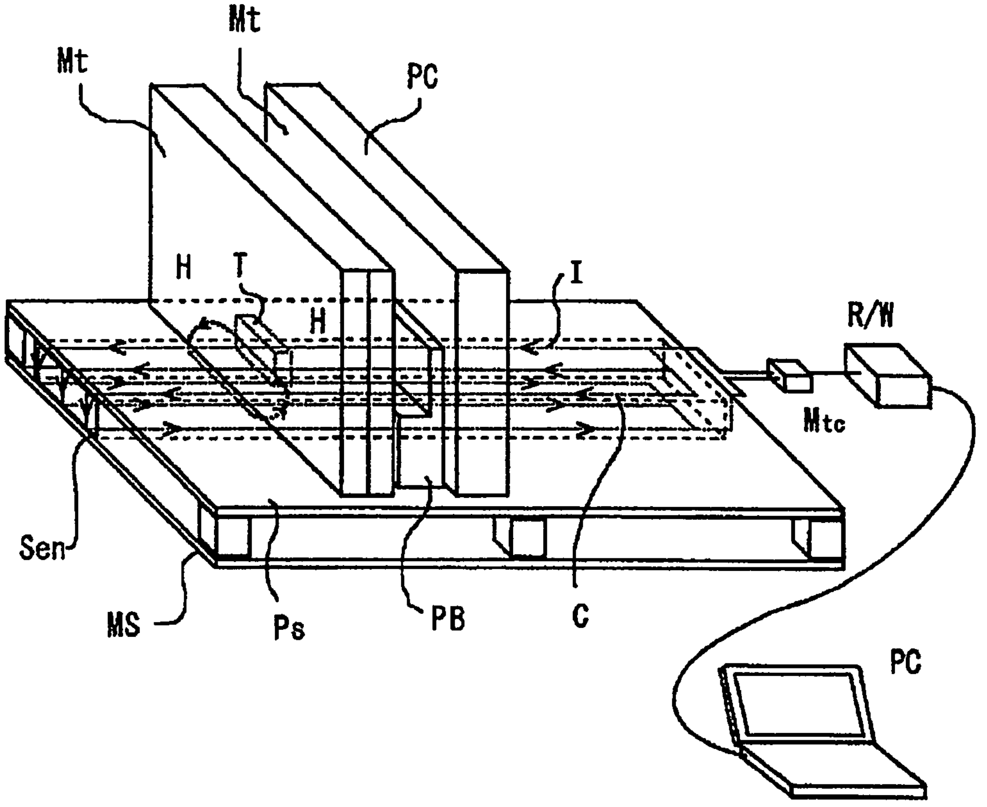

FIG. 14 is a schematic view illustrating an applied example of the multiplane imaging system to a tag connected to a computer.

Figure 15:
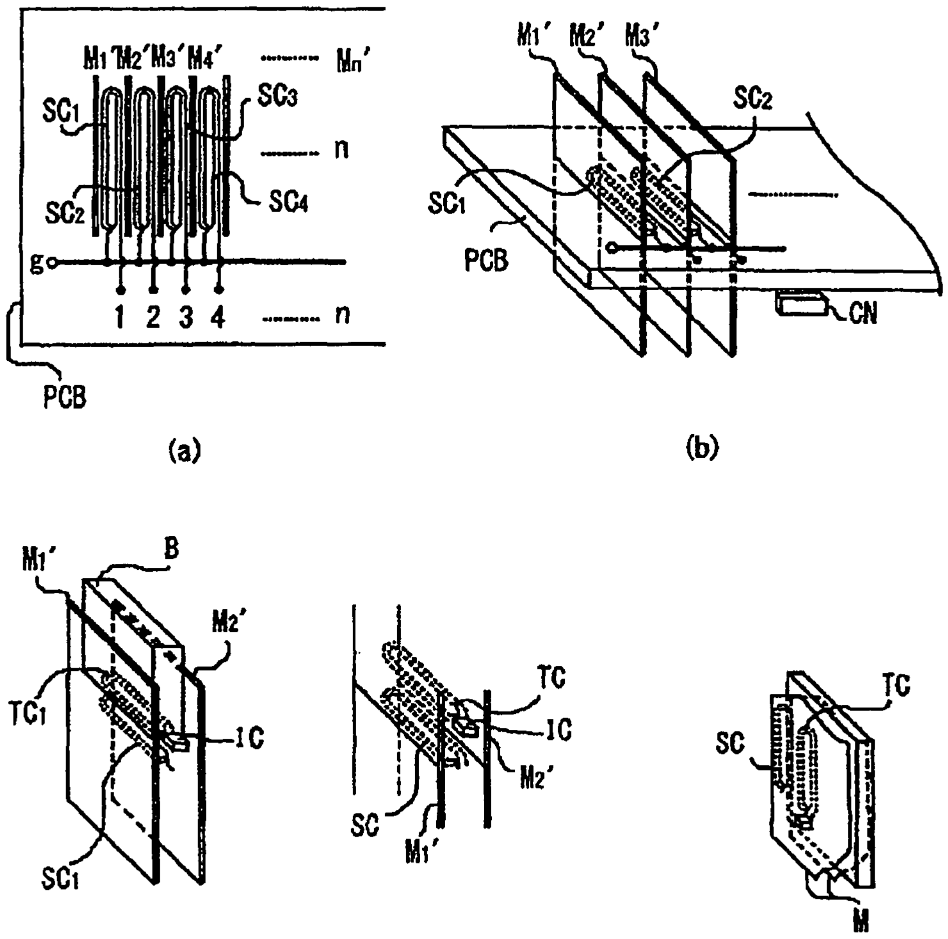

FIG. 15 [(*a*), (*b*), (*c*), (*d*), (*e*)] is schematic views of examples of multi-sensors or multi-sensors/tags.

Figure 16:
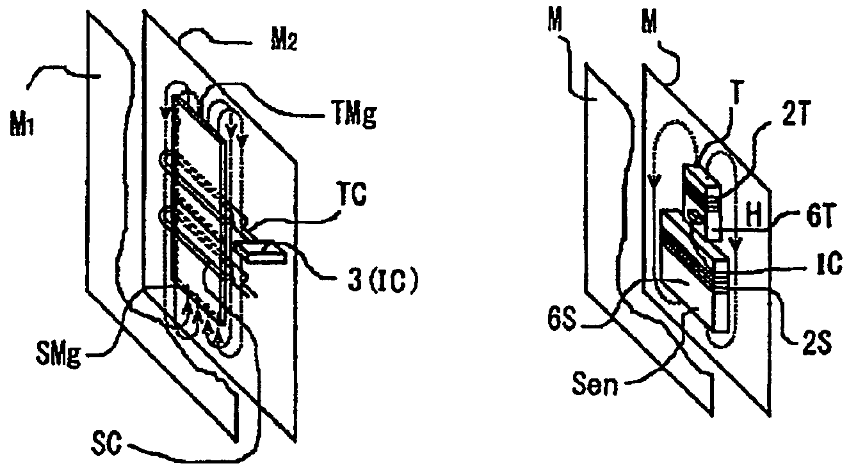

FIG. 16 [(*a*), (*b*)] is schematic views illustrating applied examples multiplane imaging system to the sensor and tag.

Figure 17:
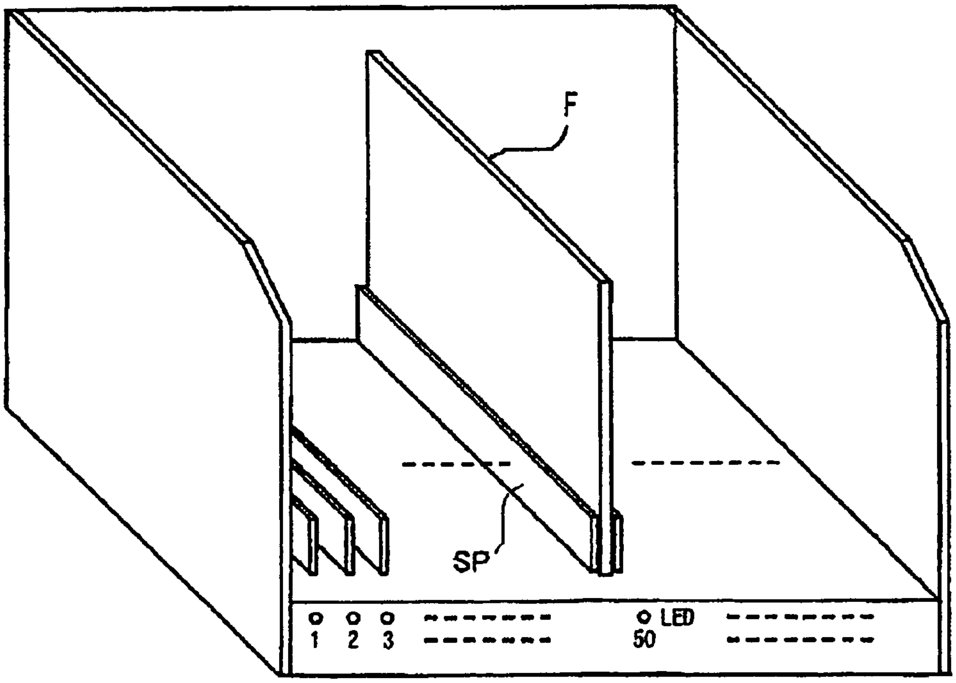

FIG. 17 is a schematic perspective view illustrating a shelf for inventory control by the sensors illustrated in FIG. 16.

Figure 18:
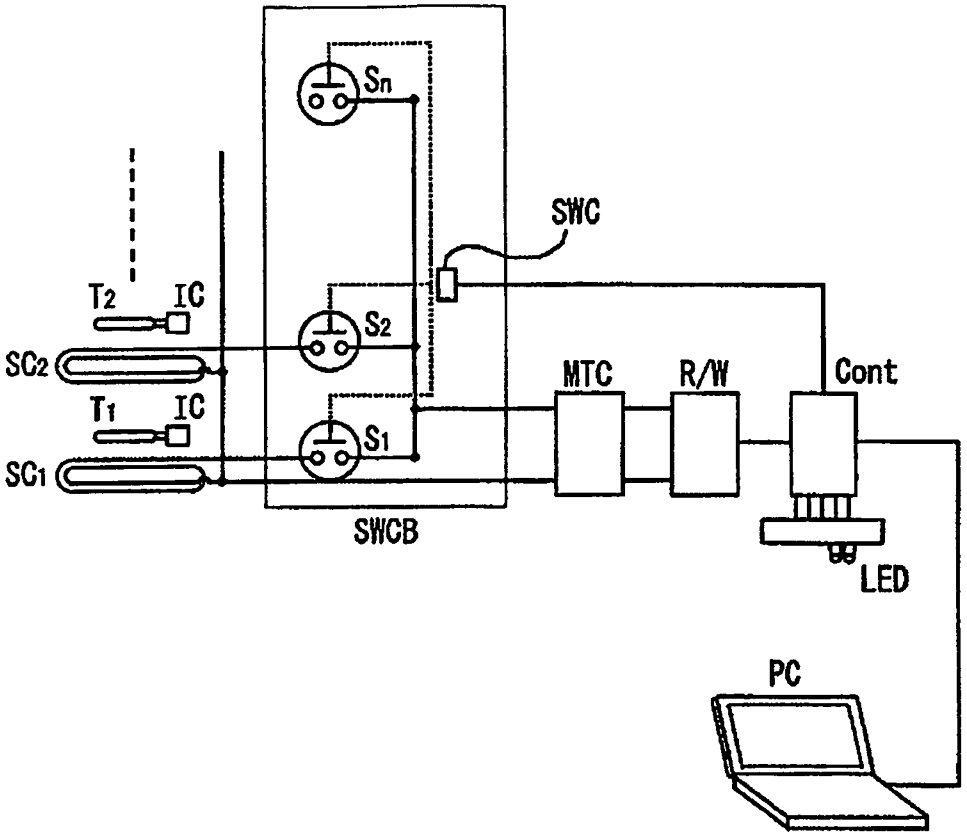

FIG. 18 is schematic view illustrating a sensing system for sensing the tags or tagged objects and for selecting the required tag or tagged object.

REFERENCE CHARACTER LIST

Ins Insulating plate
R Coiled body
C Coil
t Thickness (of paper or plastic)
SC, $SC_1$, $SC_2$, $SC_3$, $SC_4$ . . . SCn Sensor coil
TC, $TC_1$ Tag coil
T, $T_1$, . . . Tn Tag
$R_1$, $R_2$, $R_3$, $R_4$ . . . Rn Tag
$S_1$, $S_2$, $S_3$, $S_4$ Small gap Magnetic substance
CW Cut opening
MP Magnetic plate
MS Metal shelf
Mg Magnetic substance
M Metal face
Mtc Matching component
Mt Metal plate (metal face)
$M_1$ to $M_9$ Metal plate (metal face)
$M_1$', $M_2$', $M_3$', . . . Mn' Shield plate
$M_{1F}$ Metal foil
R/W Reader/writer
i, $i_1$ to $i_3$ Electric current
I Electric current
S Space
OP opening
Sen Sensor
IV, −IV/2 Electromotive force
d Length of magnetic path
ds Depth
$d_M$ Thickness
SP Separating plate
PB Stand
P Object
Ps Plastic sheet
PS Power
MISEMAS Sensor system
H, $H_1$ to $H_4$ Magnetic field components
PCB Printed circuit board
CN Connector
B, F Box
SWC Switch
Cont Control unit
Dec Control unit
Sh Small metal plate
W Cable
MB Metal body
2S, 2T Coil
6S, 6T Polygonal magnetic substance
$\mathbf{6}_1$, $\mathbf{6}_1$', $\mathbf{6}_1$" Magnetic substance (magnetic path)
Mech Mechanical component
Key Cont Controlling circuit
g ground
SMg, TMg Magnetic substance

PREFERRED EMBODIMENTS BY THE PRESENT INVENTION

Hereinafter, the preferred embodiments by the present invention are explained in details.

Embodiment

Hereinafter embodiments with respect to Multi-Image Effect and Separation method for Magnetic Sensor and Tag are explained as referring to drawings.

Figure 1:
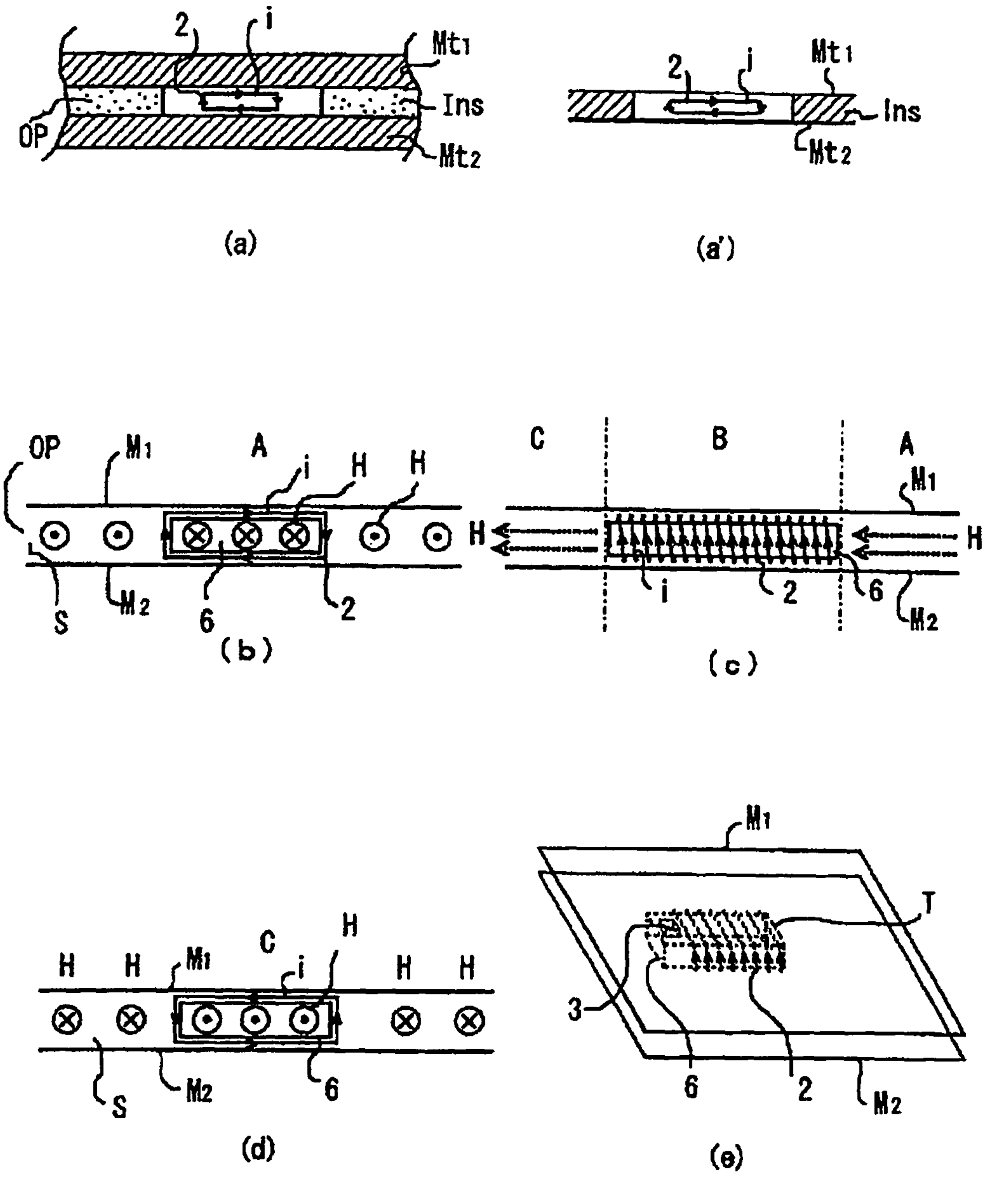

FIG. 1 is the schematic views for explaining a first embodiment. FIG. 1 (*a*) illustrates a rectangular coil 2 arranged between an upper metal plate $Mt_1$ and a lower metal plate $Mt_2$. The two metal plates are separated by an insulating plate Ins in-between. An electric current i flows in the coil 2.

A coil 2 illustrated in FIG. 1 (*a*') does not show a square shape, but an oval shape. In FIG. 1 (*b*), the coil 2 is wound around a magnetic substance (magnetic path) 6 arranged between thin metal plates $M_1$, $M_2$, such that magnetic field components H in the magnetic substance direct from the front surface of the drawing to the rear surface when the electric current i flows as arrows indicated. Magnetic field components H in a space S between the two metal sheets direct from the rear surface of the drawing to the front surface. Dimensions of the metal sheet (metal face) $M_1$, $M_2$ are limited, but virtually equivalent to indefinite dimension, and ends of the space S are opened.

FIG. 1 (*c*) is a side view of the magnetic substance 6 in FIG. 1 (*b*) and the coil 2, in which the electric current i flows, is wound around the magnetic substance 6. FIG. 1 (*b*) is a cross-sectional view viewed from A side in FIG. 1 (*c*), while FIG. 1 (*d*) is a cross-sectional view viewed from C side in FIG. 1 (*c*), where the magnetic components direct opposite directions to those in FIG. 1 (*b*).

FIG. 1 (*e*) is a perspective view of a tag T arranged between two metal sheets (metal faces) $M_1$, $M_2$. An IC 3 is connected to both ends of the coil 2 wound around the magnetic substance 6. When a frequency f=13.56 MHz is used, the coil 2 can be resonated most effectively, a relation between an inductance L of the coil and a capacity C of the IC satisfy the following equation.

$$2\pi f=1/\sqrt{(LC)}$$

When C is ca. 22 PF, the inductance L is determined as ca. 6μ. It is better to adjust the inductance in a state where the coil is arranged between the two metal sheets in order to avoid sensitivity from lowering due to deviation of the resonating frequency. But it is enough to adjust the inductance of the coil arranged on the one metal sheet. When a metal plate is arranged near to the coil, the resonating frequency is shifted to a higher side due to increase of stray capacitance.

Figure 2:
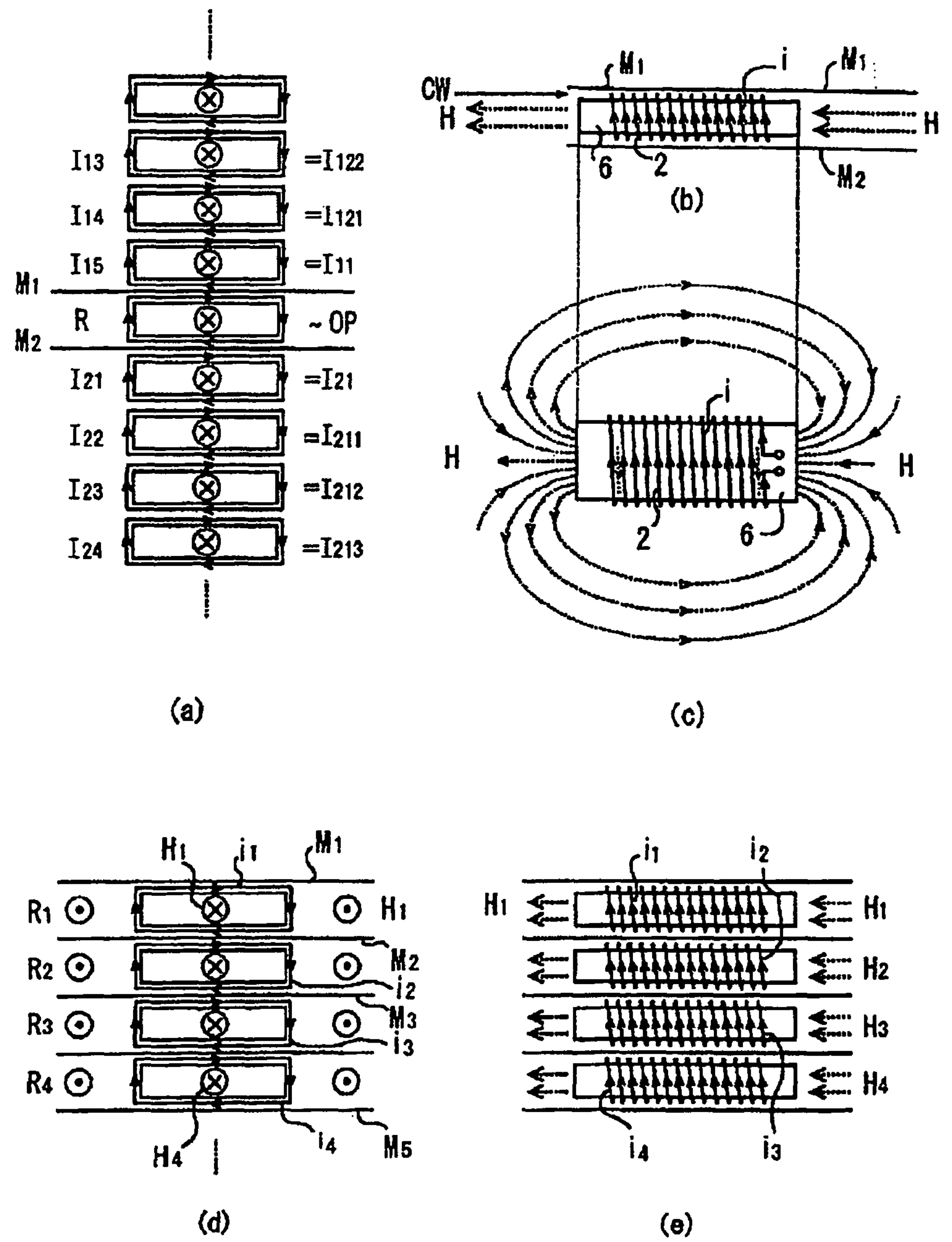

FIG. 2 (*a*) is a schematic view illustrating the multi-image effect caused by merely a coiled body R exiting between the two metal sheets $M_1$, $M_2$. Continuing mirror images $I_{11}$, $I_{12}$, $I_{13}$, . . . (effects by these images are decreasing in accordance with the distance from the center) are generated by confronting two mirrors (metal plates) $M_1$, $M_2$. You can realize these continuing mirror images, when you stand between the two confronting mirrors.

In the case of the one metal sheet, magnetic field components are generated at a side but not generated at the other side, so that the magnetic field components are intensified two times (increased by 6 dB). However, when one more sheet is added, the magnetic field components are closed in between the two metal sheets, so that generated intensified magnetic field components can be condensed between the two metal sheets. Magnetic field components between the two neighboring images are compensated each other, but magnetic components pass through both sides of the images of the coiled body direct in the same direction, so that the magnetic field components are not compensated each other, but accumulated.

FIG. 2 (*b*) is a side view viewed from right side of the coiled body shown in FIG. 2 (*a*). Magnetic field components H passing through the magnetic substance 6 direct from the right side to the left side, while magnetic field components at front side and the rear side of the magnetic substance 6 direct from the left side to the right side. When the metal sheets are cut near the end of the magnetic substance (at a position CW), strong magnetic field components are exposed outside, so that these strong magnetic field components can be picked up for sensing.

FIG. 2 (*c*) is a plan view of the coiled body viewed from a top side of FIG. 2 (*b*). In FIG. 2 (*c*), a distribution of the magnetic field components H in the space between the two metal sheets $M_1$, $M_2$, is illustrated.

As explained above, when a coiled magnetic substance core exists alone, magnetic field components spread in a 360° space. However, when one metal plate is arranged, the magnetic field components are concentrated in a 180° space, so that intensity of the magnetic field components is doubled. When one more metal plate is added, the magnetic field components are closed in the space between the two metal plates, so that condensed intensified magnetic field components can be obtained and be utilized effectively. Not only magnetic field components generated along a center axis of the coil but also magnetic field components leaked from the sides of the metal plates, can be utilized.

FIG. 2 (*d*) is a cross-sectional view illustrating a system where a plurality of coil units $R_1$, $R_2$, $R_3$ and $R_4$ are piled up. Generally speaking the coil units can be piled up $R_1$, $R_2$, $R_3$, $R_4$ . . . Rn without interfering each other. Magnetic field components $H_1$ are generated by an electric current $i_1$ flowing in the coil unit $R_1$. In the same manner magnetic field components $H_2$, $H_3$, $H_4$ are generated by respective electric currents $i_2$, $i_3$, $i_4$ in respective coil units $R_2$, $R_3$, $R_4$.

FIG. 2 (*e*) is a side view of the system shown in FIG. 2 (*d*) viewed from the right side. Intensive magnetic field components can be obtained from the cut side CW or a window of the system can be utilized for the sensor or the tag. The sensor or the tag may be inserted between the metal plates so as to interact with magnetic field components, as in the case of a probe.

As will explain below, pairs of a sensor coil and a tag are arranged in spaces between the two metal plates under the same condition, independent sensor-tag interacting environments are attained.

Various practical applying manners of the tag or the sensor to the system comprising the coil units will be explained below.

The electric currents $i_1$, $i_2$, $i_3$, $i_4$ and the magnetic field components $H_1$, $H_2$, $H_3$, $H_4$ are the similar to those in FIG. 2 (*d*).

Figure 3:
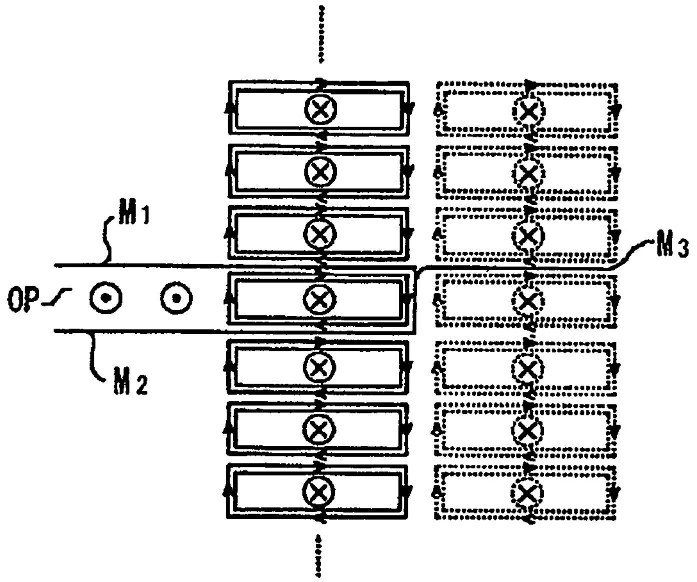
FIG. 3 is a schematic view for explaining multiple images generated by three metal plates.

FIG. 3 illustrates a coiled body arranged between the two metal plates $M_1$, $M_2$ as illustrated in FIG. 2, but right side end of the two metal plates is closed by a metal plate $M_3$. As a result only a left side of the metal plates leads to an open space and magnetic field components are reflected by the metal plate $M_3$ and directed to the left-sided open space. Mirror images are formed by the metal $M_3$ on the right side.

Figure 4:
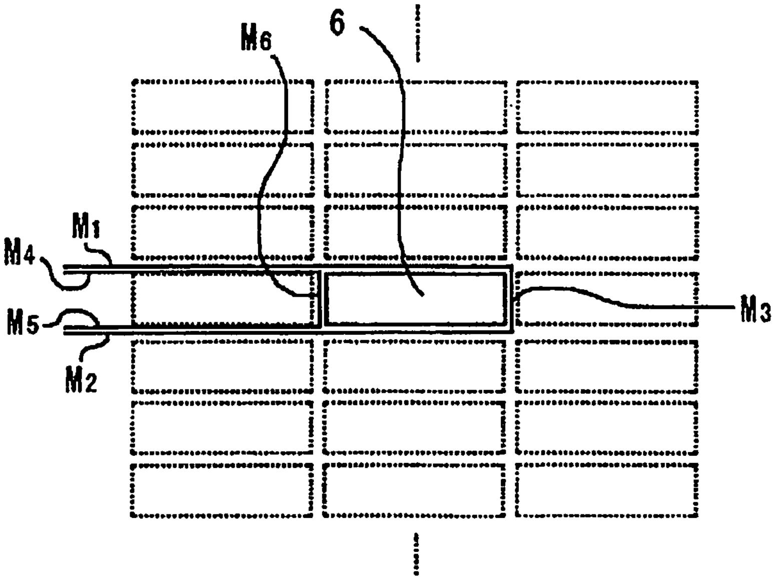
FIG. 4 is a schematic view for explaining multiple images generated by four metal plates.

FIG. 4 illustrates a state where a rectangular metal case with a left-side opening consisting of metal plates $M_4$, $M_5$, $M_6$ is inserted between the two metal plates $M_1$, $M_2$ such that small gaps are formed between the respective outer metal plates ($M_1$, $M_2$, and $M_3$) and the corresponding inner metal plates ($M_4$, $M_5$) and the magnetic substance 6. In this case, magnetic field components pass trough these small gaps. In the drawing, only the magnetic substance 6 is illustrated, but the coil wound around the magnetic substance is omitted.

In this arrangement, it seems as if the magnetic substance (magnetic path) 6 is buried in the metal plates. However, since the magnetic substance is not contacted with the metal plates, the magnetic field components can pass through the gaps formed between the metal plates, so that a sensor or tag attached to the magnetic substance can be sensed from the outside by utilizing the passed magnetic field components. This arrangement is an applied example of a metal buried sensor.

FIG. 5 (*a*) illustrate a configuration where the coiled magnetic substance 6 is buried among metal plates (or metal faces) $M_4$, $M_5$, $M_6$, $M_7$, $M_8$, $M_9$ such that small gaps $S_1$, $S_2$ are formed in a space on the left side and small gaps $S_3$, $S_4$ are formed in a space on the right side by between these metal plates and the metal plates $M_1$, $M_2$ arranged outside. Since no short circuits are formed between the inner metal plates and the outer metal plates, electric potentials are generated in the respective gaps and magnetic field components can pass through these gaps.

FIG. 5 (*b*) illustrates another configuration where the small gaps $S_1$, $S_3$ are formed only by the two metal plates $M_1$, $M_2$. In this configuration, both open ends illustrated in FIG. 2 (*a*) are narrowed. In FIGS. 5 (*a*) and (*b*) coils are omitted for explanation purpose.

In a configuration illustrated in FIG. 6 (*a*), the upper metal plate $M_1$ and the lower metal plate $M_2$ are connected and short circuited each other by small metal plates Sh, so that a circular electric current is generated. When the circular electric current acts to compensate magnetic field components, additional magnetic substances (magnetic paths) 6', 6" are arranged on the left side and on the right side of the center magnetic substance (magnetic path) 6, so that an induced voltage IV generated in the coil are compensated by respective induced voltages −IV/2 generated by the additional magnetic substances. As a result, the magnetic field components are prevented from being compensated.

As illustrated in FIG. 6 (*a*), the voltage IV is induced by the center magnetic path and −IV/2 is induced by the left magnetic path and −IV/2 is induced by the right magnetic path, namely, $$IV-IV/2-IV/2=0$$

which means induced circular current is rendered to zero, so that a reverse current does not flows in the coil.

FIG. 6 (*b*) is a plan view of the configuration illustrated in FIG. 6 (*a*).

When an extending distance, namely, extending axis of the magnetic field is required to be infinite or short distance, magnetic paths on both sides are connected to the center magnetic path as illustrated in the drawing, so that magnetic field components pass through these magnetic paths and are bent at connecting positions of these magnetic paths. Thus symmetrical closed intensive magnetic field components are obtained. A sensor or a tag can be buried in spaces between the two magnetic paths. In the present case the two additional magnetic paths are arranged on both sides, but one additional magnetic path arranged on one side is also effective.

FIG. 7 (*a*) and FIG. 7 (*b*) illustrate a configuration where the magnetic paths extend infinitely (fairly long length d) and both metal plates are insulated or both sides are opened. Since it is not necessary to take a depth into consideration in this configuration, magnetic paths are virtually considered as straight infinite paths. However, since there are losses in magnetic field components and permeability of the magnetic substance is finite, and since leaked magnetic field components return along the neighboring magnetic path, it is impossible to attain a fairly long magnetic path. The length d of the magnetic path varies in accordance with permeability, a thickness of the magnetic substance, electric current and voltage. FIG. 7 (*a*) is a cross-sectional view and FIG. 7 (*b*) is a plan view.

FIG. 8 (*a*) illustrates a configuration where tags are mounted on papers or plastic plates. Tags $T_1$, $T_2$ . . . Tn are attached to the papers or plastic plates with thickness of a few millimeters. When metal plates (metal faces) $M_1$, $M_2$ . . . Mn are arranged on or under the tags, interactions among the tag can be prevented. The respective tags are separated by the metal plates $M_1$, $M_2$ . . . Mn. The tag T can be placed in a plastic box or inserted in a tip of the plate, so that a plate tag system is attained.

Even if a thickness of the papers or the plastic plate is set 1 to 5 mm, interactions among the tag are not observed, so that individual tags can be identified.

FIG. 8 (*b*) illustrates a system where the tags $T_1$ . . . Tn and metal films $M_{1F}$ are attached to papers or objects P to be classified. Magnetic field components generated respective tags $T_1$ . . . Tn are read by a sensor Sen arranged below. Usually the tag comprised a coil and an IC, but these components are omitted in this drawing. Since the tags are longitudinally arranged and magnetic field components of the respective tags extend vertically on both sides as illustrated in dotted lines, a coil C of the sensor is horizontally wound around and flatly mounted on a magnetic plate MP.

A matching component Mtc is attached to the both ends of the coil, in order that total configuration comprising the magnetic substance plate MP, the metal foils and the tags mounted on the metal foils, can be matched or resonated. A reader/writer R/W is connected to the matching component Mtc via cable W. In order to control the reader/writer and total system, a computer PC is connected to the reader/writer R/W.

FIG. 8 (*c*) illustrates a system where the tag $T_1$ is transversely arranged and generated magnetic field components of the tag horizontally extend on both sided. The sensor Sen arranged below where the coil C is longitudinally wound around the magnetic plate MP, so that the sensor interacts with the tag $T_1$ mounted thereon. A coil and an IC on the tag $T_1$ are also omitted in this drawing.

There are two ways for arranging the tag longitudinally or transversely on the sensor as illustrated in FIGS. 8 (*a*) and (*b*), a communication distance can be set a little bit longer in the system illustrated in FIG. 8 (*c*).

FIG. 9 illustrates examples where coils are wound around cylindrical magnetic substances.

As illustrated in FIG. 9 (*a*), when a cylindrical body is arranged between two flat plates, large spaces are formed on both sides of the cylindrical body. In order to eliminate such large spaces, the two metal plates are bent so as to surround along the surface of the cylindrical body and flat gaps, where magnetic field components pass, are formed in a radial direction as illustrated in FIG. 9 (*b*). The cylindrical body is surrounded by the three metal plates as illustrated in FIG. 9 (*c*) and by the four metal plates as illustrated in FIG. 9 (*d*).

These configurations illustrated in FIGS. 9 (*a*) to (*d*) are special. But usually metal plates are arranged around square magnetic cores, since it is not necessary to bend the metal plates, so that these configurations can be arranged more easily.

FIG. 10 illustrates special configurations where the magnetic path and additional magnetic paths are arranged between an outer metal plate cylinder and an inner metal plate cylinder.

Since the upper and lower metal plates sandwiching the magnetic substance (magnetic path) 6 illustrated in FIGS. 1 and 2, are virtually infinite planes, no circular electric currents are generated, so that no reverse magnetic field components are generated by induced currents.

When the additional magnetic substances are arranged as illustrated in FIGS. 6 and 7, the magnetic field components are prevented from spreading and the voltage is induced in order to suppress the circular electric current from generating, so that the magnetic field components are not influenced by the surrounding metal plates.

FIG. 10 (*a*) illustrates a configuration where the metal plates $M_1$ and $M_2$ sandwiching the magnetic substance (magnetic path) 6, are arranged concentrically, so that returning paths of the magnetic field components are formed in a gap between the two cylindrical metal plates. This configuration is equivalent to the configuration illustrated in FIG. 1.

Since the two cylindrical metal plates are insulated each other, a closed circuit is not formed. When an electric current flows on the outer cylindrical metal plate clockwise, an electric current is induce on the inner cylindrical metal plate counterclockwise, so that no induction effects are caused. In this configuration, the metal plates are formed in a cylindrical shape, but they may be formed in an oval or polygonal shape. By these configurations, infinite flat planes are not required, but finite planes can induce magnetic field components in the same way as the infinite planes.

FIG. 10 (*b*) illustrates a configuration where a magnetic substance (magnetic path) 6' functioning as a returning magnetic path is added the configuration illustrated in FIG. 10 (*a*), so that magnetic field components pass more easily. FIG. 10 (*c*) illustrates a configuration where the magnetic substance (magnetic path) 6 and (returning magnetic path) 6' having larger cross-sections are employed, so that magnetic field components pass more easily than in the configuration illustrated in FIG. 10 (*b*). The configurations illustrated in FIGS. 10 (*b*) and (*c*) are equivalent to the configuration illustrated in FIG. 7. The cylindrical configurations illustrated in FIG. 10 can be arranged more compact and enable to sense inside of the metal plate or to transmit signals through the metal plate.

As in case of the configuration illustrated in FIG. 7, the length d of the magnetic path varies in accordance with permeability, a thickness of the magnetic substance, electric current and voltage.

FIG. 11 illustrates a modified configuration from the configuration illustrated in FIG. 10. In the modified configuration, when a depth ds of the magnetic path is set rather short, the ends of the both magnetic paths 6, 6' are connected via a third magnetic path 6", so that the magnetic paths are not short circuited or opened. By this configuration magnetic field components can pass through the metal without being affected by the metal. For example, a configuration where a U-shaped magnetic rod in which the cylindrical metal plate $M_2$ is inserted is buried a hole formed in a metal body, is probable. A sensor or an IC tag can be arranged in one of the magnetic substances 6, 6' or 6". In FIG. 11 (*a*) a drawing on the left side is a front view and a drawing on the right side is a side view. The cylindrical metal plates $M_1$, $M_2$ having a test tube like shape are concentrically buried in a metal body MB, and the U-shaped magnetic substance is inserted between the two cylindrical metal plates $M_1$, $M_2$, so that magnetic field components return via the U-shaped magnetic path. The shape of the magnetic substance is like a horseshoe. FIG. 11 (*b*) illustrate a configuration where a double cylindrical structures formed by two metal plates $M_1$, $M_2$ pierces through the metal body MB, so that magnetic field components can go through even the metal body having a certain thickness $d_M$.

FIG. 12 illustrates a configuration where the two cylindrical magnetic substances are concentrically arranged. The respective cylindrical magnetic substances can be used as independent circuits or as returning magnetic paths. This configuration is a multi-cylindrical configuration equivalent to the configurations illustrated in FIGS. 2, 3, 6, 7 and 8. In FIG. 12 (*a*), a drawing on the left side is a front view and a drawing on the right side is a side view. FIG. 12 (*b*) is a similar drawing to that illustrated in FIG. 11 (*b*). Electric currents $i_1$, $i_2$ flowing in the coils and the magnetic substances (magnetic paths) $6_1$, $6_1'$, $6_1''$ are independent each other.

FIG. 13 illustrates an applied example of the sensor system (MISEMAS) employing the configuration illustrated in FIG. 6. In the system a slit for inserting a magnetic card or other cards is arranged, so that magnetic field components pass thorough the metal slit. In this system, the sensor can communicate with a non-contact type IC card.

In the same way, idle slits arranged in ATMs or ticket vendors can be utilized. In the present system, cards are identified by the sensor via the reader/writer R/W and identified results are judged by a control unit Dec. Mechanical components Mech such as a motor are controlled by a controlling circuit (Key Cont). A door of the system is opened by a handle. Power PS for the system is supplied via commercial power sources, primary cells or other energy sources.

FIG. 14 is other applied example of the sensor systems MISEMAS.

When a computer having a metal plate (metal face) Mt or a tag is attached to a metal face, the tag is placed between metal walls. In this situation, the usual tag is not active. But when a metal responsive tag being interactive with magnetic field components along the metal face or a surface electric current perpendicular to the magnetic field, is employed, the effects of the metal plate or the metal face can be positively utilized.

A stand PB for placing a power source and a mouse is arranged between computers in order not to disturb the magnetic field components. The stand may be formed out of wood or plastic, but in some cases metal is acceptable.

A plastic plate Ps is spread on a metal shelf MS for placing the computer, and under the plastic plate a sensor comprising a magnetic sheet with a thickness of ca. 10 mm and a coil C wound around the magnetic sheet is arranged on the metal shelf MS. When an electric current I flows in the coil C, magnetic field components H are generated. The reader/writer R/W is connected to the both ends of the coil via the matching component Mtc, and the computer PC is connected to the reader/writer.

FIG. 15 illustrates an applied example of the MISEMAS for selecting or identifying individual objects having a narrow width between 1 to 10 mm. An object having a width more than 10 mm can be identified without difficulties, because leaking magnetic field components are kept small and interactions with neighboring objects are small. In the case of an object having the narrow width, the interactions with neighboring objects must be suppressed as keeping the magnetic field components from leaking by a small amount as well as increasing magnetic flux $\phi$. But a measure to increase the magnetic flux is not enough. Since it is difficult to wind the coil with enough turns when a gap or a width is narrow, it is necessary to arrange the magnetic substance in the center of the coil in order to increase the magnetic flux.

When a sensor coil is arranged closely to a tag and a metal plate is introduced, the magnetic field components are concentrated and intensified by the multi-image effects of the metal plate, so that the interactions with neighboring tags or sensors are suppressed as well as shield effects are attained. When the sensor coil is not arranged closely to the tag due to a configuration, magnetic field components can be led to the tag by the magnetic substance, so that the tag can be easily interact with the coil from a certain distance. In addition, since the magnetic field components are concentrated, leaking portions of the magnetic field components are decreased.

FIG. 15 (*a*) is a plan view illustrating a printed circuit board PCB on which thin coils are formed by etching. A length of the coils and a width among these coils are determined in accordance with objects to be sensed. In order to prevent leaking of the magnetic field components and interactions among the respective coils $SC_1$, $SC_2$, $SC_3$, $SC_4$ . . . SCn shielding metal plates $M_1'$, $M_2'$, $M_3'$, $M_4'$ . . . Mn' are arranged between the neighboring coils.

One ends of the respective coils $SC_1$, $SC_2$, $SC_3$, $SC_4$ . . . SCn are connected to a common ground g and the other ends of these coils are individually connected to the reader/writer R/W via a switching circuit or a matching circuit.

FIG. 15 (*b*) is a perspective view of the print circuit board illustrated in FIG. 15 (*a*). As illustrated in FIG. 15 (*b*), the metal plates $M_1'$, $M_2'$, $M_3'$, $M_4'$ . . . Mn' are formed wider than and higher than the respective coils $SC_1$, $SC_2$, $SC_3$, $SC_4$ . . . SCn on the printed circuit board. The metal plates are inserted in slots formed on the printed circuit and extending upward and downward from the printed circuit board. Sizes of the respective sensors or a combined circuit of a pairs the sensors and tags are determined properly so as not to interfere each other. Other ends of the coils are connected to a connector CN. Since positions of the tags can be respectively identified by the respective sensor antennas arranged as mentioned above, the present example is different from those illustrated in FIG. 8 and FIG. 14.

FIG. 15 (*c*) illustrate a configuration where a tag comprising a long and thin tag coil $TC_1$ and the IC under a box B with a width of a few mm, a sensor coil $SC_1$ for sensing the tag arranged under the tag and the metal plates $M_1'$, $M_2'$ for shielding leaked magnetic field components are arranged.

FIG. 15 (*d*) illustrates the IC connected with the tag coil TC exaggeratedly. The two coils, namely, the tag coil and the sensor coil, interact in a shielded space between the metal plates. Therefore the space is separated from other spaces.

FIG. 15 (*e*) illustrates a configuration where the sensor coil SC is attached to the side face (rear face), the tag coil is attached to the outside (rear face) and the metal plate is also attached to the side face (rear face).

FIG. 16 (*a*) illustrates a configuration where the sensor coil SC is wound around a magnetic substance SMg and the tag coil is wound around a magnetic substance TMg in order to intensify the magnetic field components around the sensor coil SC and the tag coil TC or in order to enlarge magnetic flux. The interaction between the sensor and the tag is intensified by approximating the coils or the magnetic substances each other. The IC is attached to the tag coil TC.

FIG. 16 (*b*) illustrates a configuration where a sensor Sen comprising a rectangular magnetic substance 6S and a coil 2S wound around the magnetic substance 6S and a tag T comprising a rectangular magnetic substance 6T and a coil 2T would around the magnetic substance 6T, are arranged between the two metal plates M. A total sensor system can be arranged more compact by this configuration and can be intensify the interaction between the sensor and the tag.

Since the magnetic field components are concentrated around the magnetic substance, it is possible to arrange the metal plates smaller. Since the required numbers of the sensors are limited, it is better to select excellent sensors even if the sensors are expensive. The senor illustrated in FIG. 16 (*b*) can be selected by such consideration. Since the tag illustrated in FIG. 16 (*b*) is compactly arranged, but rather expensive, sometimes the tag comprising a flat coil as illustrated in FIG. 16 (*a*) is selected. Configurations and shapes of the sensors or the tags should be properly determined in accordance with usages of the sensors or the tags.

Monolithic metal plates (metal faces) are not always employed, they should be employed in accordance with the configurations of the sensors and the tags. Even metal plates are applied separately to the sensor and the tag, they have shielding effects. However, it should be considered that there are probabilities that the magnetic field components leak out of a gap between the two metal plates, and leaking magnetic field components interact with neighboring sensors or tags, when the metal plates are separately applied to the sensor and the tag.

FIG. 17 illustrates a shelf for inventory control of thin files, cases, boxes F or the like. The sensors as illustrated in FIGS. 15 and 16 are attached to appropriate positions on a bottom or a rear face of the shelf. And the tags are attached to appropriate positions of the files, cases for CDs, DVDs or the like and boxes F in accordance with the positions of sensor attached to the shelf. When an identification number of a file is inputted to the sensor system, the sensor reads the inputted ID number and indicates its position by lighting a LED lamp. Since metal is comprised in separating plates SP partially or totally, in order to support the files, the cases or boxes as well as to shield signals from the neighboring files, cases or boxes.

The shelf explained above can be used as cabinets in various objects. Usually when a gap between the sensors or the tags is narrowed, interference is caused, so that the sensors do not work correctly such as read improperly or read twice or more. However, the MISEMAS method by the present invention can read and identify even thin objects.

FIG. 18 illustrates a sensing system for sensing the tags or tagged objects and for selecting the required tag or tagged object.

In the system, N sets of sensors and tags (namely objects) positioned above the respective sensors are arranged. The respective sensors are connected one after the other as switching electrically to the reader/writer R/W via a mechanical switch SWC, and the reader/writer read signals from the sensors. Read signals are stored in a control unit Cont.

The read signals are also transmitted to a computer PC, where the signals are stored and displayed. A currently active sensor is recognized by an indicator on the switch. A required object is selected according to the read or stored signals in the control unit or in the computer. A switching cycle or individual reading times can be set optionally, but should be set longer than individual reading/writing times of the reader. Usually the reader/writer reads/writes within 0.1 to 0.2 seconds.

When one reading/writing is finished, the switch changes to the next sensor.

When the reader/writer can read faster, for example 100 to 400 sensors per minute, sensors are switched consecutively one after the other immediately after receiving a signal indicating reading/writing of the current senor is finished.

If a required object is designated by the computer beforehand and when the switch is changed to sensor corresponding to the required object, an LED lamp positioned the required object is turned on by the control unit Cont. If an appropriate mechanism is arranged in the system, required object can be taken out from the shelf automatically.

As explained above, the reader/writer can distinguish approximating sensors or tags which sometimes interfere each other by employing the multiple imaging system and the MISEMAS method of the present invention as effectively utilizing electric currents flowing on the metal plates and in the magnetic paths.

What is claimed is:

1. A sensor tag multiplane system comprising one or more metal plates having a curved face and a sensor or tag having a magnetic substance and a coil wound around said magnetic substance, wherein:

said sensor or said tag is sandwiched by said one or more metal plates such that an axis direction of said coil is parallel to faces of said one or more metal plates;

at least one end of said one or more metal plates perpendicular to the axis direction of said coil is insulated from any other metal plates, and wherein the magnetic substance is insulated from and not contacted by at least one of the one or more metal plates;

magnetic field components generated by said coil are condensed in a space formed by said one or more metal plates and said sensor or said tag, wherein the magnetic field components generated along a center axis of said coil and the magnetic field components leaked from the side of the metal plates are utilized; and said space is sandwiched by said one or more metal plates.

2. The sensor tag multiplane system according to claim 1, wherein said magnetic substance is formed in a cylindrical shape, and said metal plates are arranged so as to surround said cylindrical magnetic substance.

3. The sensor tag multiplane system according to claim 1, wherein said plurality metal plates are formed concentric cylindrical, oval or polygonal shapes, and said sensor or said tag is sandwiched by a space formed by said cylindrically, ovally or poligonally shaped metal plates.

4. An application of the sensor tag multiplane system according to claim 1, wherein said sensor tag multiplane system is applied to a slot for inserting a magnetic card.

5. An application of the sensor tag multiplane system according to claim 1, wherein said sensor tag multiplane system is employed for controlling a computer, metal mold or a metal component.

6. The application of the sensor tag multiplane system according to claim 5, wherein a resonating frequency is adjusted beforehand when an inductance is changed by surrounding metal faces of said computer, said metal mold or said metal component.

7. The sensor tag multiplane system according to claim 1, wherein pairs of a sensor or a tag and a coil wound around said sensor or said tag are consecutively arranged and respectively separated by metal plates from other pairs.

8. A computer application system or a device which is constituted by said sensor tag multiplane system according to claim 1.

9. A sensor tag multiplane system comprising a plurality of metal plates having flat or curved faces and a sensor or a tag having a magnetic substance and a coil wound around said magnetic substance, wherein:

said sensor or said tag is sandwiched by said plurality of metal plates such that an axis direction of said coil is parallel to faces of said plurality of metal plates;

said plurality of metal plates are insulated from each other, and wherein the magnetic substance is insulated from and not contacted by the plurality of metal plates;

magnetic field components generated by said coil are condensed in a space formed by said plurality of metal plates and said sensor or said tag, wherein the magnetic field components generated along a center axis of said coil and the magnetic field components leaked from the side of the metal plates are utilized; and said space is sandwiched by said plurality of metal plates.

10. The sensor tag multiplane system according to claim 9, wherein:

at least two of said plurality of metal plates are short circuited;

at least one or more magnetic substances functioning as returning paths for generated magnetic field components by said coil, is arranged in a space formed by said short circuited metal plates and said sensor or said tag parallel to an axis direction of said coil; and said space is sandwiched by said short circuited metal plates.

11. The sensor tag multiplane system according to claim 10, wherein said magnetic substance and said magnetic substances for returning paths are formed in a monolithic body.

* * * * *